United States Patent [19]

Kosaka et al.

[11] Patent Number: 5,040,195
[45] Date of Patent: Aug. 13, 1991

[54] SYNCHRONIZATION RECOVERY CIRCUIT FOR RECOVERING WORD SYNCHRONIZATION

[75] Inventors: Akio Kosaka; Takashi Kawakami, both of Tottori, Japan

[73] Assignees: Sanyo Electric Co., Ltd., Moriguchi; Tottori Sanyo Electric Co., Ltd., Tottori, both of Japan

[21] Appl. No.: 452,668

[22] Filed: Dec. 19, 1989

[30] Foreign Application Priority Data

Dec. 20, 1988 [JP] Japan ................ 63-321096

[51] Int. Cl.⁵ .......................... H04L 7/00
[52] U.S. Cl. ..................... 375/114; 370/105.4; 370/106
[58] Field of Search ............. 375/114, 116; 371/42, 371/46; 370/100.1, 105.1, 105.4, 106; 340/825.44; 307/269; 328/63, 72

[56] References Cited

U.S. PATENT DOCUMENTS

| | | | |
|---|---|---|---|
| 3,308,434 | 3/1967 | Glasson et al. | 375/114 |
| 3,760,355 | 9/1973 | Bruckert | 375/116 |
| 3,909,724 | 9/1975 | Spoth et al. | 375/116 |
| 4,029,900 | 6/1977 | Addeo | 328/155 |
| 4,506,372 | 3/1985 | Massey et al. | 375/116 |
| 4,520,480 | 5/1985 | Kawai | 370/100.1 |
| 4,554,540 | 11/1985 | Mori et al. | 340/825.44 |
| 4,638,497 | 1/1987 | Komatsu et al. | 375/116 |
| 4,713,692 | 12/1987 | Kirkland | 375/114 |
| 4,726,014 | 2/1988 | Goldman et al. | 370/100.1 |
| 4,788,681 | 11/1988 | Thomas et al. | 375/114 |
| 4,802,192 | 1/1989 | Eto et al. | 375/116 |

FOREIGN PATENT DOCUMENTS 63-245032 10/1988 Japan .

*Primary Examiner*—Stephen Chin
*Attorney, Agent, or Firm*—Armstrong, Nikaido, Marmelstein, Kubovcik & Murray

[57] ABSTRACT

In a cellular-type communication system, a receiving apparatus of a mobile station which has received a forward control channel message recovers word synchronization of the received data. More particularly, the receiving apparatus converts serial FOCC data into a 8-bit parallel data signal while generating 8-bit parallel synchronization data indicative of a word synchronizing position in the parallel data above, and thus applies these two parallel data to a microcomputer. The microcomputer detects the synchronizing position of the synchronization data and then determines effectiveness of those data among the data signal that follow the corresponding bit position, for storing them in a memory.

36 Claims, 13 Drawing Sheets

| BIT SYNC. FIELD |
|---|
| 1 0 1 0 1 0 1 0 1 0 |

| WORD SYNC. FIELD |
|---|
| 1 1 1 0 0 0 1 0 0 1 0 |

SYNCHRONIZATION RECOVERY CIRCUIT FOR RECOVERING WORD SYNCHRONIZATION

BACKGROUND OF THE INVENTION

1. Field of the Invention

The present invention generally relates to synchronization recovery circuits and radiocommunication apparatuses using such circuits, and more particularly, to a synchronization recovery circuit which detects a word synchronizing character in a received data signal for recovering word synchronization in a cellular-type communication system, and to a radiocommunication apparatus such as car telephone and portable telephone using such a synchronization recovery circuit.

2. Description of the Prior Art

A cellular-type communication system has been widely utilized in the form of a mobile radio telephone such as car telephone or portable telephone In such a cellular-type communication system, an area to be covered is divided into multiple cells, each of which is provided with a radio base station and assigned a group of channels. Such a small-sized service area of each cell and reduced transmission output of a base station enable frequent reuse of the frequencies, admitting an increased number of subscribers.

In such a cellular-type communication system, when a mobile station equipped with a radiocommunication apparatus, for example, an automobile equipped with a car telephone moves from one cell to another, several kinds of digital control including channel change or the like are performed in order that complete communications are established between the radio base stations involved and the car telephone apparatus.

Each radio base station has two types of radio channels, one of which is a bidirectional control channel for such several kinds of digital control as mentioned above, and the other is a bidirectional audio channel for conversation over the telephone.

For such bidirectional communications, four channel types are employed. More particularly, the control channel comprises a forward control channel (FOCC) used for communication from a radio base station to a mobile station and a reverse control channel (RECC) used for communication from a mobile station to a radio base station, which are generally used for control of every kind before the audio channel is established, and not for conversation. On the other hand, the audio channel comprises a forward audio channel (FVC) used for communication from a radio base station to a mobile station and a reverse audio channel (RVC) used for communication from a mobile station to a radio base station.

On these channels, a message, or a data signal containing a word synchronizing character is transmitted at predetermined word and bit rates. Therefore, a radiocommunication apparatus of a mobile station is first required to detect the word synchronizing character out of a received data signal for recovering word synchronization. For this purpose, in a conventional radiocommunication apparatus, as disclosed in the U.S. Pat. No. 4,029,900, there is provided a synchronization recovery circuit which detects the word synchronizing character out of the data signal for recovering word synchronization. In this synchronization recovery circuit, the word synchronization is recovered by supplying a control circuit for data processing with a word synchronizing signal which has been generated based on the detected word synchronizing character.

The conventional synchronization recovery circuit, however, is constituted in the light of its hardware construction such that the word synchronizing signal is serially applied to the control circuit. Therefore, in order to recover word synchronization based on such a serial word synchronizing signal, also the data signal must be serially applied to the control circuit. The control circuit receives both of the word synchronizing signal and the data signal serially and accepts the data signal as effective data for use, only after a word synchronizing position is identified. In the above mentioned construction wherein the data signal is adapted to be accepted after word synchronization is established, data may possibly drop out due to high data transmitting rate of the celluar-type communication system. Therefore, the control circuit is always required to access the data signal and thus can not do any other processing such as key scan, LCD display, AF (Analog Frequency) processing, radio-functional processing or the like during the access, prevented from performing any kind of processing required as a mobile station, at a higher speed.

As one solution to this problem, a control circuit comprised of two microprocessors has been proposed, with one microprocessor performing synchronization recovery of the received data and the other performing any other processing such as key scan. This has led to another problem, however, that the two microprocessors require additional complicated control such as communication control (for example, determination of communication protocol) and timing control between themselves.

Furthermore, a technology of converting the data signal from serial form to parallel form before supplied to the control circuit has been proposed in Japanese Patent Laying-Open No. 63-245032. Since the word synchronizing signal is supplied in serial form, however, such a parallel data signal in itself does not allow identification of a synchronizing position, so that any software-controlled processing becomes indispensable in the control circuit. More specifically, such software-controlled processing may include a processing for determining a synchronizing character pattern by shifting a data signal bit by bit in order to identifying the position of the synchronizing character in the accepted data signal again. Therefore, with such a technology, a higher operating speed of the radiocommunication apparatus can hardly be attained.

SUMMARY OF THE INVENTION

An object of the present invention is to enable a radiocommunication apparatus to perform processings at a higher speed in a cellular-type communication system.

Another object of the present invention is to enable word synchronization recovery of received data with parallel signal processing in a radiocommunication apparatus as a mobile station.

Briefly stated, according to the present invention, serial data containing a predetermined word synchronizing character is converted into first parallel data of n bits (n is integer of 2 or more) while generating second parallel data of n bits which indicates a word synchronizing position in the first parallel data, and based on these first and second parallel data, word synchronization of the serial data is recovered.

The main advantage of the present invention is, therefore, that since the received data signal and the word synchronizing signal indicating the synchronizing position thereof are both processed as parallel data, the word synchronization can be quickly recovered and thus all the processings required from a radiocommunication apparatus can be done at a higher speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 (a) and (b) are diagrams showing specific examples of a bit synchronization field and a word synchronization field, respectively.

DESCRIPTION OF THE PREFERRED EMBODIMENTS

In the following, an embodiment of the present invention will be described with reference to the accompanying drawings. The embodiment to be described hereinafter is on a case where the present invention is applied to the forward control channel (FOCC) among the signal paths previously described. On this forward control channel, a forward control channel message (baseband data signal) is transmitted from a radio base station to a mobile station (radiocommunication apparatus), which will preform processings such as registration, channel change or the like according to the received message.

Figures 1, 2A, 2B:
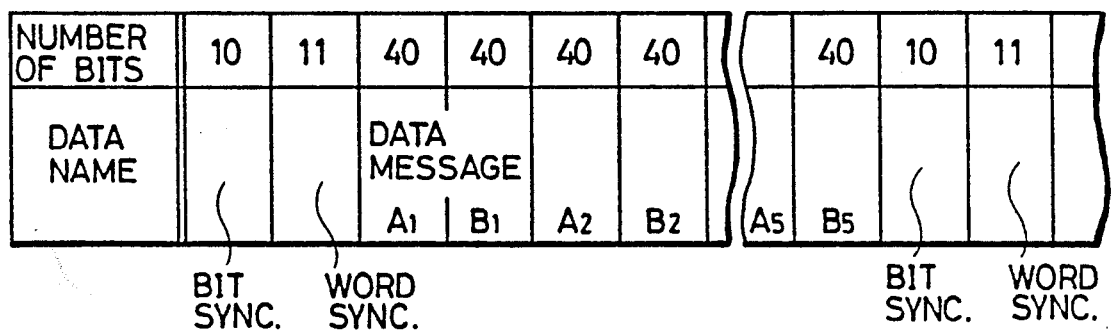
FIG. 1 is a diagram showing a typical format of a forward control channel message.

FIG. 1 is a diagram showing a typical format of such a forward control channel message. This message is largely composited of a bit synchronization field, a word synchronization field and a data message. More particularly, the bit synchronization field is, as shown in FIG. 2 (a), a 10-bit field having alternate 1 and 0 bits recurrent in sequence (known as dotting). The word synchronization field in turn, as shown in FIG. 2 (b), is a 11-bit field having a bit arrangement which is rarely seen in the data message. In the United States, for example, the arrangement of "11100010010" as shown in FIG. 2 (b) is employed. Furthermore, the data message comprises data messages A and B each having 40 bits, which are alternately repeated 5 times for each (designated as $A_1$ to $A_5$ and $B_1$ to $B_5$, respectively). Such 5-time repetition of the respective data messages is for error correction, i.e. for determining effectiveness of data with a coincidence ratio of more than 3/5, or by majority decision when there exists difference between the received data.

Meanwhile, though not shown in FIGS. 1 and 2, one busy-idle bit is added to every 10 bits of the bit synchronization field, the word synchronization field and the respective data messages. This busy-idle bit serves to inform a mobile station of whether the transmission source of the message, or a radio base station is prepared to receive, or of vacancy status of the reverse control channel (RECC). Accordingly, the bit synchronization field, the word synchronization field and the data message are in practice comprised of 11 bits, 12 bits and 44 bits, respectively. The message shown in FIG. 1 will be then transferred, for example in the United States, at a 10 kilo bit/second rate after Manchester-encoded in the well-known manner.

Figure 3:
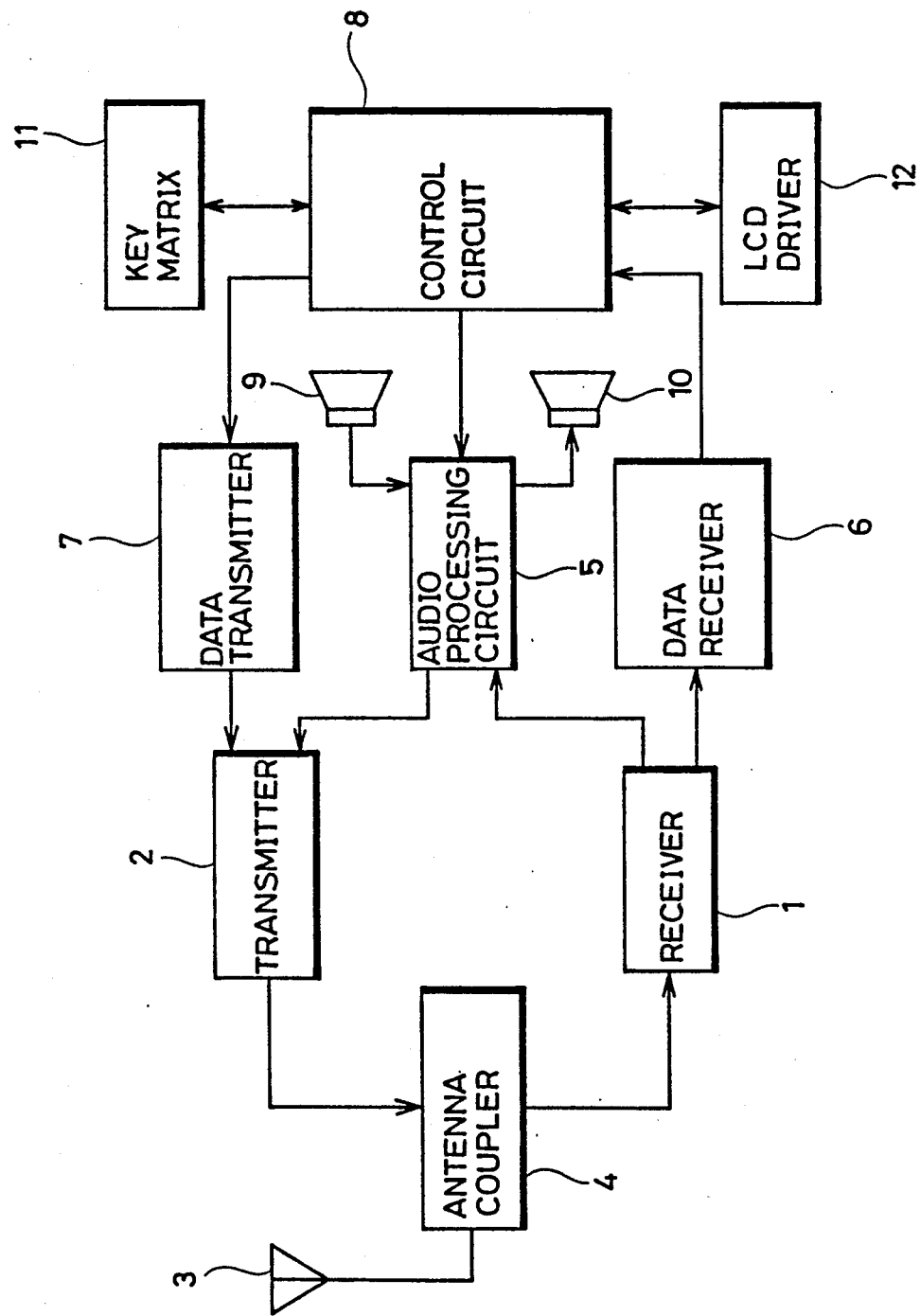
FIG. 3 is a schematic block diagram showing a radiocommunication apparatus according to an embodiment of the present invention.

Subsequently, FIG. 3 is a schematic block diagram of a radiocommunication apparatus as a mobile station in a cellular system according to an embodiment of the present invention. In the diagram, an antenna 3 is connected to a receiver 1 and a transmitter 2 through an antenna coupler 4. The receiver 1 FM-demodulates a received signal which has been received from a radio station with the antenna 3. The receiver 1 applies a data signal on the forward control channel to a data receiver 6 and a received audio signal on the forward audio channel to an audio processing circuit 5 by use of a discriminator not shown. The data receiver 6 detects a word synchronizing character out of the applied message of FOCC and applies a word synchronizing signal to a control circuit 8 constituted of a 8-bit microprocessor, along with the data signal. The control circuit 8 identifies a synchronizing position of the data signal, based on the applied word synchronizing signal, before executing any kind of control according to the data signal. The control circuit 8 performs additional processing and control necessary for a key matrix 11 or an LCD driver 12. On the other hand, the audio processing portion 5 amplifies the applied message of FVC for application to a handset speaker 10. This enables a user of a mobile station to receive a communication from another. Meanwhile, the control circuit 8 performs control such as muting instruction also for the audio processing circuit 5.

The data transmitter 7 Manchester-encodes a data signal from the control circuit 8 for application to the transmitter 2 as a message for RECC. Meanwhile, the audio processing circuit 5 processes an audio signal applied from a user through a microphone 9 for application to the transmitter 2 as a transmitting audio signal for RVC. The transmitter 2 FM-modulates these signals for transmission to a base station by use of the antenna 3.

Meanwhile, a radio base station of each cell is connected to a mobile telephone switching office (MTSO)

not shown through a conventional land line or a microwave network. This MTSO is further connected to the public switching telephone network (PSTN), establishing interface between a mobile radio telephone and the PSTN.

Figure 4:
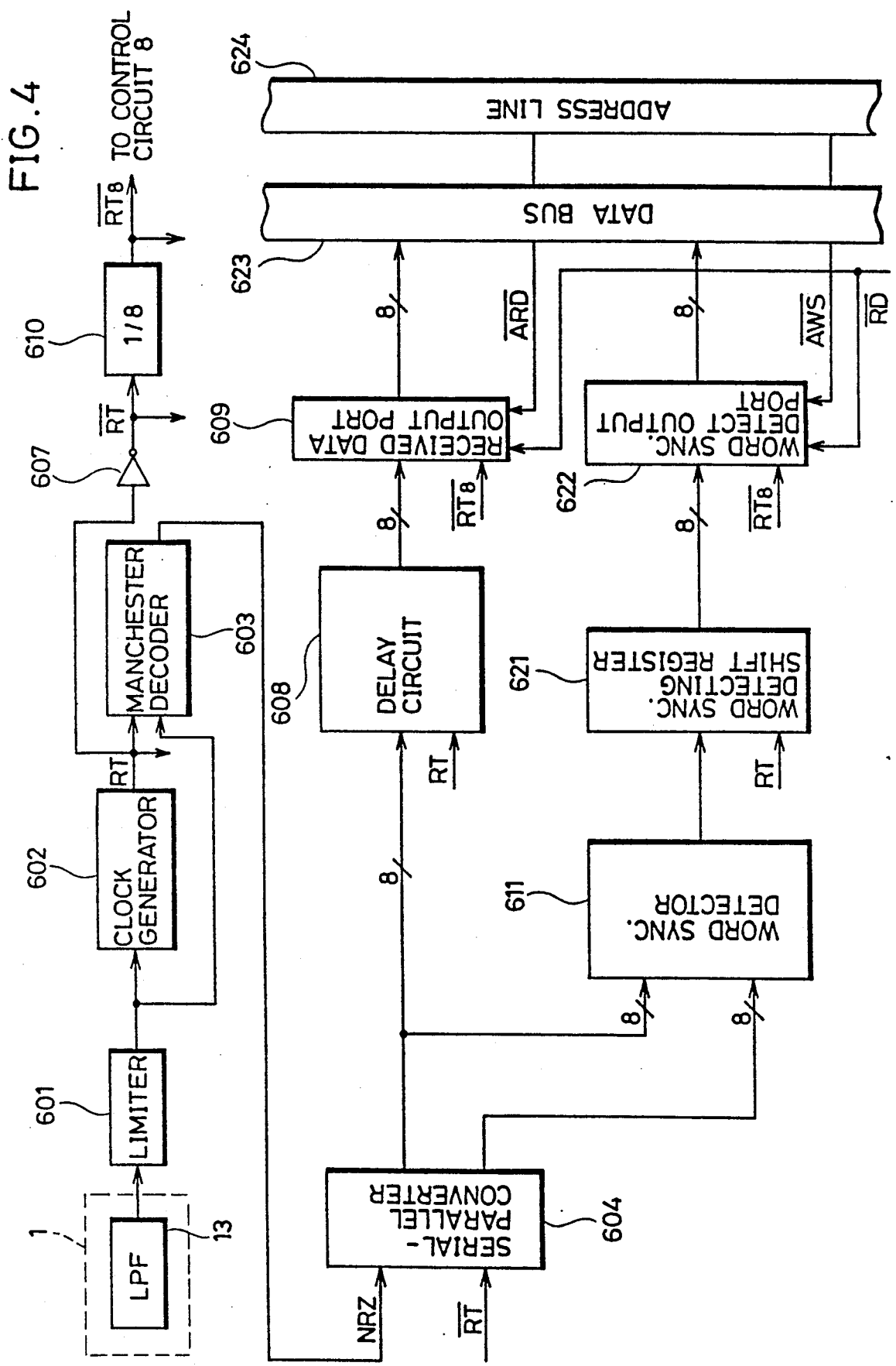
FIG. 4 is a block diagram showing an internal structure of the data receiver in the radiocommunication apparatus shown in FIG. 3.
Figure 11:
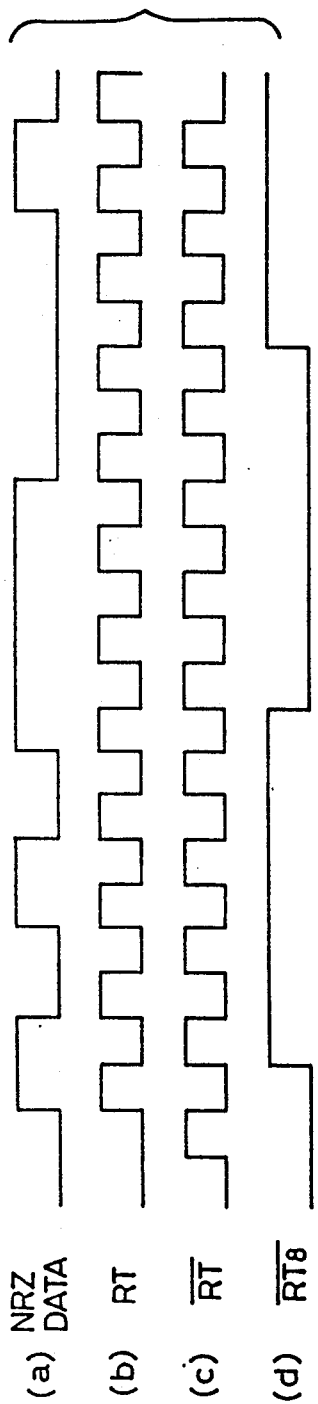
FIG. 11 is a timing chart for explaining operation of the circuit shown in FIG. 4.
Figure 12:
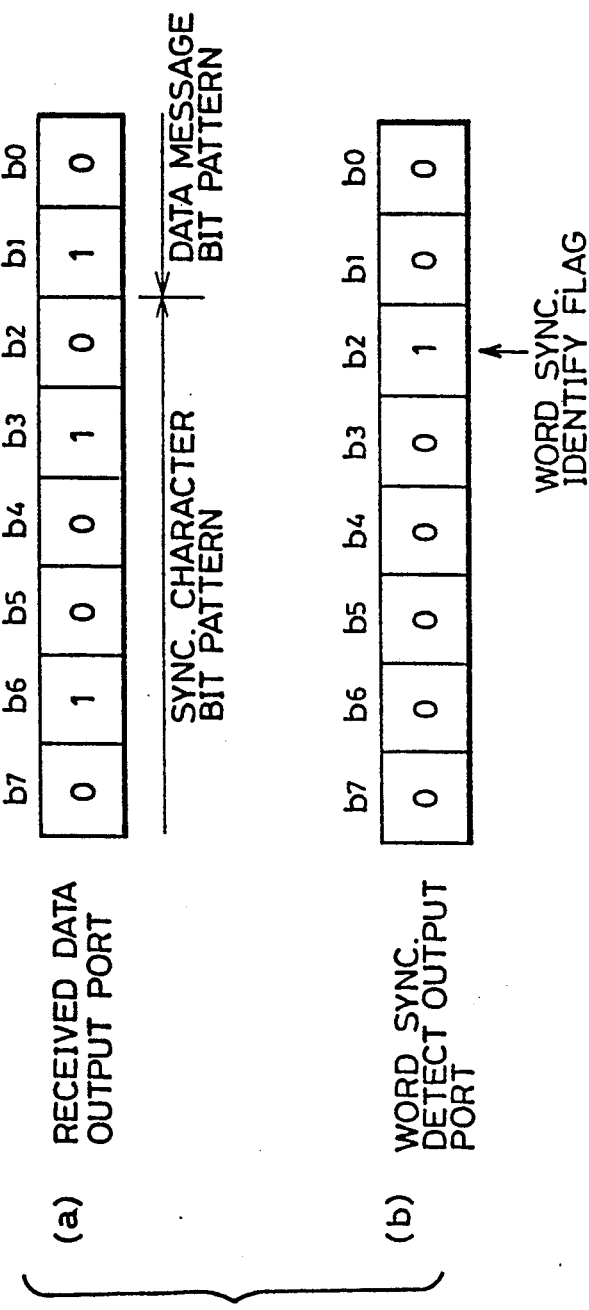
FIG. 12 is a diagram for schematically explaining operation principles of the circuit shown in FIG. 4.

Subsequently, FIG. 4 is a block diagram showing an internal structure of the data receiver 6 shown in FIG. 3, the respective parts of which are shown in the block diagrams of FIGS. 5 to 10 in detail. Furthermore, FIG. 11 is a timing chart showing signals of the data receiver 6, and FIG. 12 is a diagram for schematically explaining operation principles thereof.

First, a forward control channel message transmitted from a radio base station (not shown) is FM-demodulated in the receiver 1 and extracted by an LPF 13. The analog forward control channel message extracted by the LPF 13 is digitalized by a limiter 601 before applied to a clock signal generating circuit 602 and a Manchester decoder 603 as a data signal in Manchester code format. The clock signal generating circuit 602 which is constituted of a well-known PLL (Phase Locked Loop) circuit generates a clock signal RT (FIG. 11($b$)) which has been bit-synchronized with the data signal in Manchester code format. This clock signal RT is applied to the Manchester decoder 603 and an inverter 607, and also to a delaying circuit 608 and a word synchronization detecting shift register 621 as will be described later. On the other hand, the Manchester decoder 603 converts, in response to the data signal and the clock signal RT, the data signal from the Manchester code format to NRZ (Non Return to Zero) format (FIG. 11($a$)) and applies the converted signal to a serial-parallel converter 604. This serial-parallel converter 604 has function of a 16-bit shift register and thus converts the serial NRZ data from the Manchester decoder 603 into parallel data of 16 bits.

Figure 5:
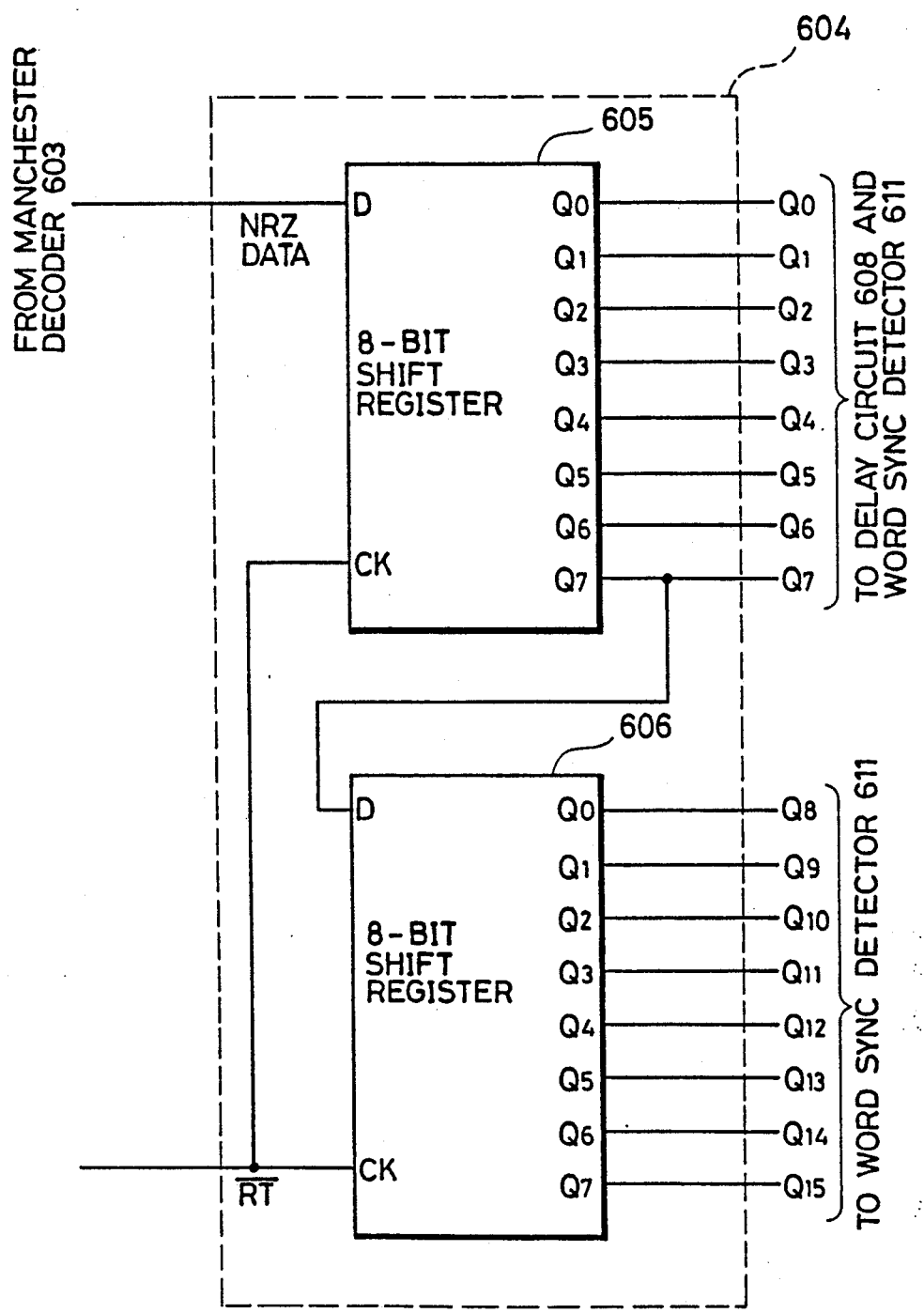
FIG. 5 is a diagram showing details of the serial-parallel converter shown in FIG. 4.
Figure 6:
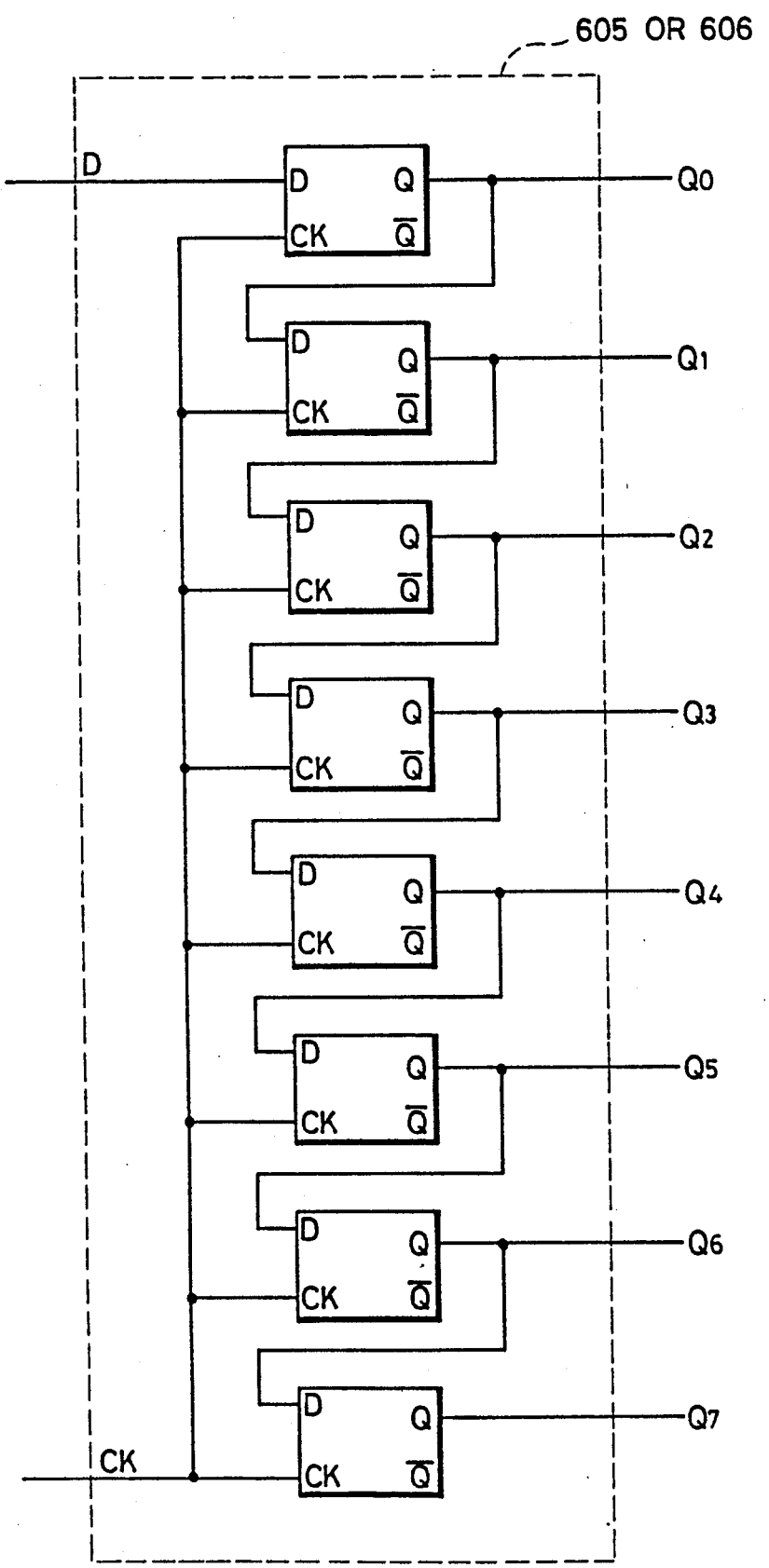
FIG. 6 is a block diagram showing details of the 8-bit shift register shown in FIG. 5.

FIG. 5 is a diagram showing a structure of the serial-parallel converter 604. As shown in the diagram, the serial-parallel converter 604 is comprised of two 8-bit shift registers 605 and 606, and a clock terminal of each shift register is supplied with output $\overline{RT}$ (FIG. 11($c$)) of the inverter 607 in FIG. 4. Therefore, the shift registers 605 and 606 both operate at a timing of the $\overline{RT}$. More particularly, the shift register 605 consecutively accepts the NRZ data at a timing of $\overline{RT}$ while applying an output $Q_7$ to a data input of the shift register 606. This shift register 606 also consecutively accepts the output $Q_7$ of the shift register 605 at a timing of $\overline{RT}$. As a result, the NRZ data from the Manchester decoder 603 is converted into 16-bit parallel data $Q_0$ to $Q_{15}$, among which the 8-bit data $Q_0$ to $Q_7$ outputted from the shift register 605 are applied to both of the delaying circuit 608 and the word synchronization detecting circuit 611 while the 8-bit data $Q_8$ to $Q_{15}$ outputted from the shift register 606 are applied to the word synchronization detecting circuit 611. Furthermore, FIG. 6 is a diagram showing a structure of the 8-bit shift register 605 or 606 shown in FIG. 5, comprising 8 flip-flops connected in series.

Turning back to FIG. 4, the 16-bit output of the serial-parallel converter 604 is applied to the word synchronization detecting circuit 611. This word synchronization detecting circuit 611 detects, based on these data, a word synchronizing character. More particularly, the word synchronization detecting circuit 611 detects a 15-bit word synchronizing character composited of the last 4 bits of the bit synchronization field and the 11 bits of the word synchronization field shown in FIGS. 1 and 2, i.e. "1010 (bit sync. field) 11100010010 (word sync. field)". Though generally the word synchronizing character may be composited of only the 10 bits of the word synchronization field, the increased bit number of the word synchronizing character which has the last 4 bits of the bit synchronization field added to the original 10 bits of the word synchronization field as described above can reduce the probability that the word synchronizing character may happen to coincide with data of the data message portion, enhancing the precision of word synchronization detection. The output signal of the word synchronization detecting circuit 611 is then accepted by the word synchronization detecting shift register 621 at a timing of the clock signal RT.

Figure 7:
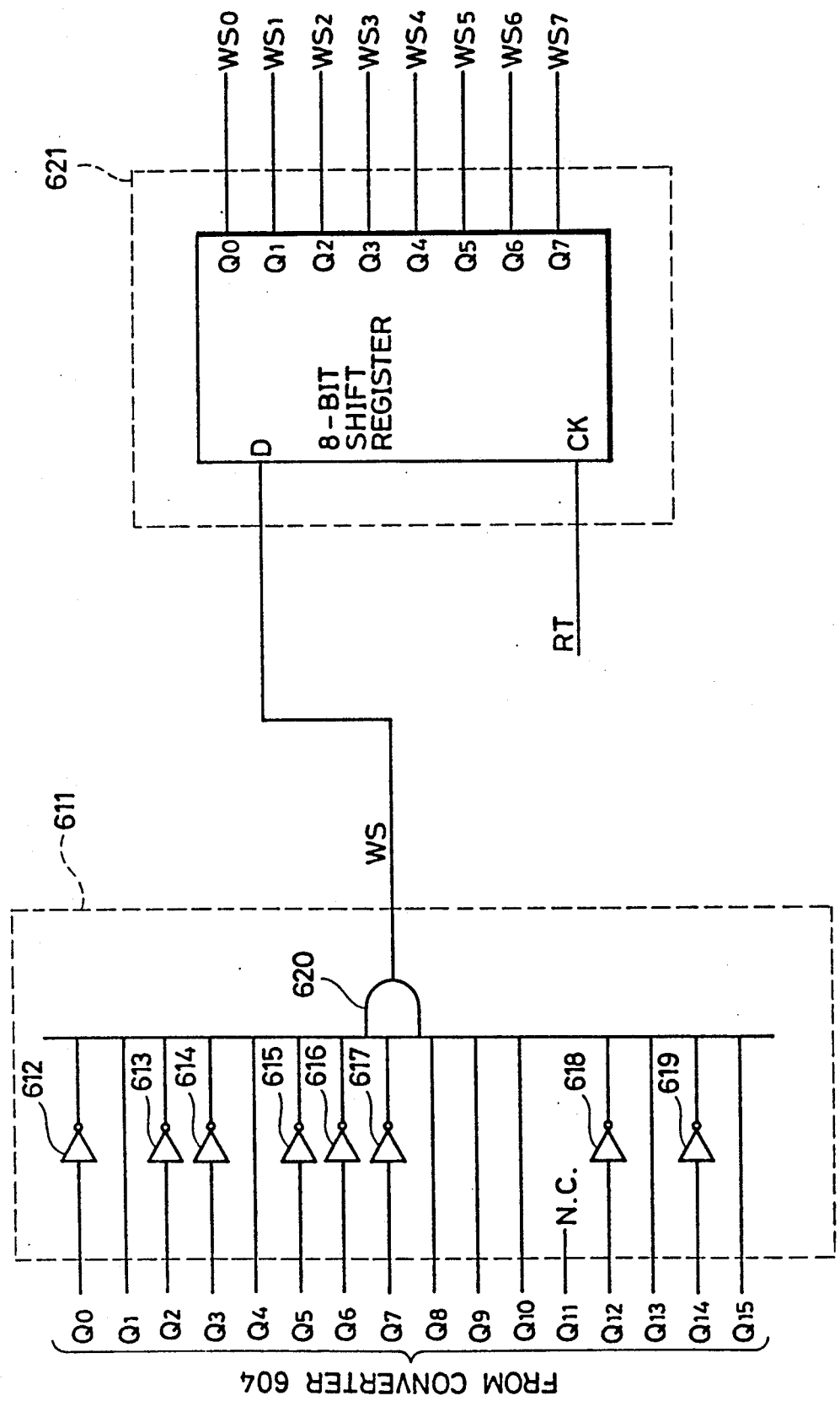
FIG. 7 is a block diagram showing details of the word synchronization detecting circuit and the word synchronization detecting shift register shown in FIG. 4.

FIG. 7 is a diagram showing details of the word synchronization detecting circuit 611 and the word synchronization detecting shift register 621. In the diagram, the word synchronization detecting circuit 611 comprises inverters 612 to 619 and an AND gate 620. The AND gate 620 generates a logical product of the outputs of the serial-parallel converter 604, or the outputs $Q_1$, $Q_4$, $Q_8$, $Q_9$, $Q_{10}$, $Q_{13}$ and $Q_{15}$, and signals obtained by inverting the outputs $Q_0$, $Q_2$, $Q_3$, $Q_5$, $Q_6$, $Q_7$, $Q_{12}$ and $Q_{14}$. Meanwhile, since the output $Q_{11}$ of the serial-parallel converter 604 is the previously described busy-idle bit which is unrelated to the word synchronization, it is not connected to the AND gate 620. Therefore, only when the outputs $Q_{15}$ to $Q_{12}$ and $Q_{10}$ to $Q_0$ of the serial-parallel converter 604 take a value of "101011100010010" equal to the above-mentioned 15-bit word synchronizing character, all the inputs of the AND gate 620 become "1", causing the AND gate 620 to output "1" indicative of detection of the word synchronization character. The output of the AND gate 620 is consecutively accepted by the word synchronization detecting shift register 621 which is a 8-bit shift register as shown in FIG. 7, at a timing of the clock signal RT, or delayed by a half cycle with respect to the $\overline{RT}$, for being converted into 8-bit parallel data $WS_0$ to $WS_7$. These 8-bit parallel data $WS_0$ to $WS_7$ are then applied to a word synchronization detection output port 622. The output port 622 simultaneously latches the 8-bit input data at a timing of output $\overline{RT8}$ (FIG. 11($d$)) of a frequency-divider 610 at which the output $\overline{RT}$ of the inverter 607 is frequency-divided by 8.

Figure 8:
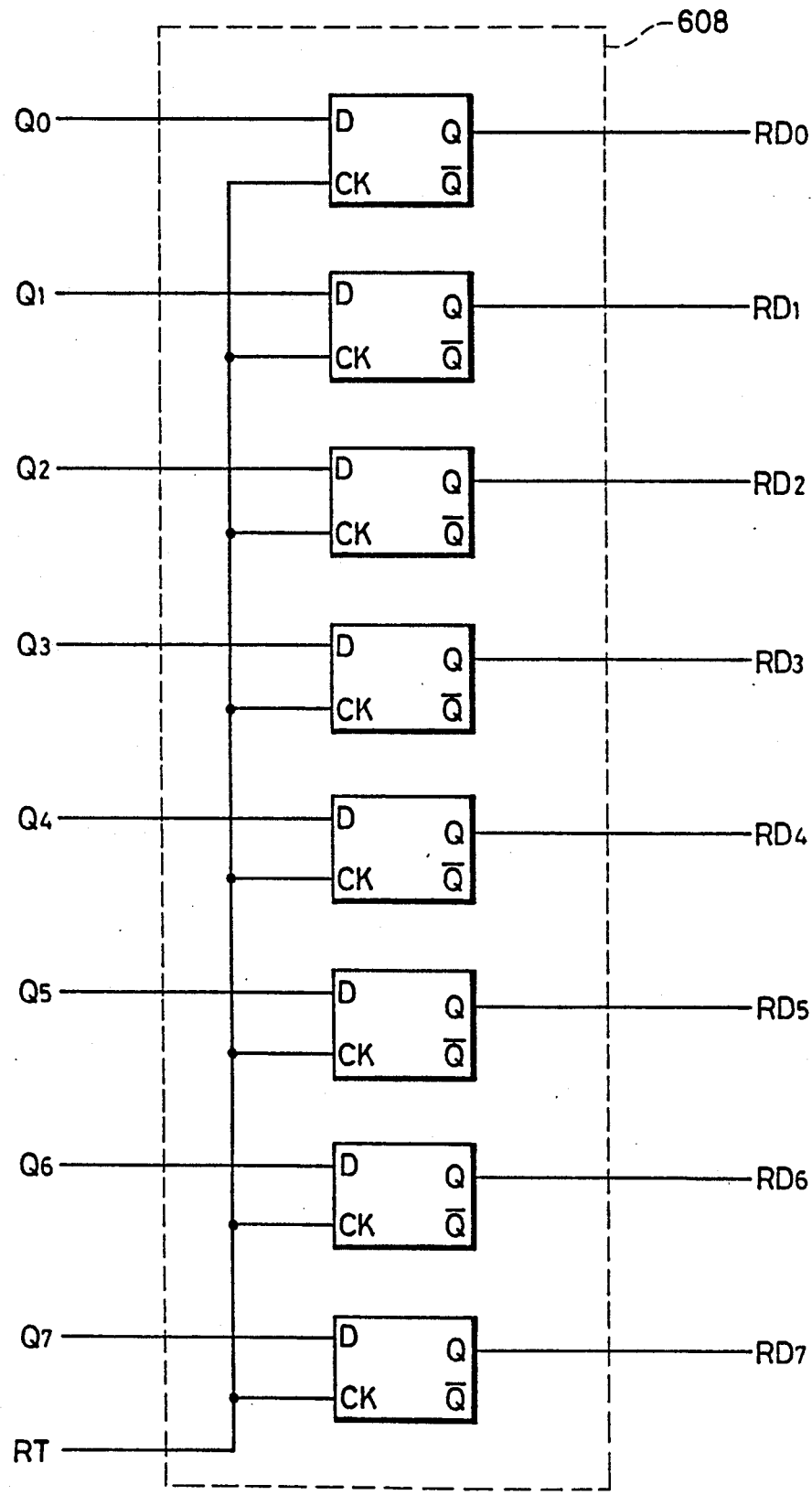
FIG. 8 is a block diagram showing details of the delaying circuit shown in FIG. 4.

Meanwhile, the outputs $Q_0$ to $Q_7$ of the 8-bit shift register 605 in the serial-parallel converter 604 are applied to the delaying circuit 608. The delaying circuit 608 is a 8-bit buffer register comprised of 8 flip-flops as shown in FIG. 8 and simultaneously accepts the 8-bit data $Q_0$ to $Q_7$ at a timing of the clock signal RT which has been delayed by a half cycle with respect to the $\overline{RT}$. In other words, this 8-bit register 608 is a timing register which has been provided for establishing synchronization with the word synchronization detecting shift register 621. The outputs $RD_0$ to $RD_7$ of this shift register 608 are applied to a received data output port 609. The output port 609, like the above-mentioned output port 622, simultaneously latches the 8-bit input data at a timing of the $\overline{RT8}$ outputted from the frequency-divider 610.

Reading-out from the output ports 609 and 622 is performed in response to address signals $\overline{ARD}$ and $\overline{AWS}$ from a 2-bit address line 624 and a read-out signal $\overline{RD}$, and output of each output port is applied to the control circuit 8 of FIG. 3, through a 8-bit data bus 623.

Figure 9:
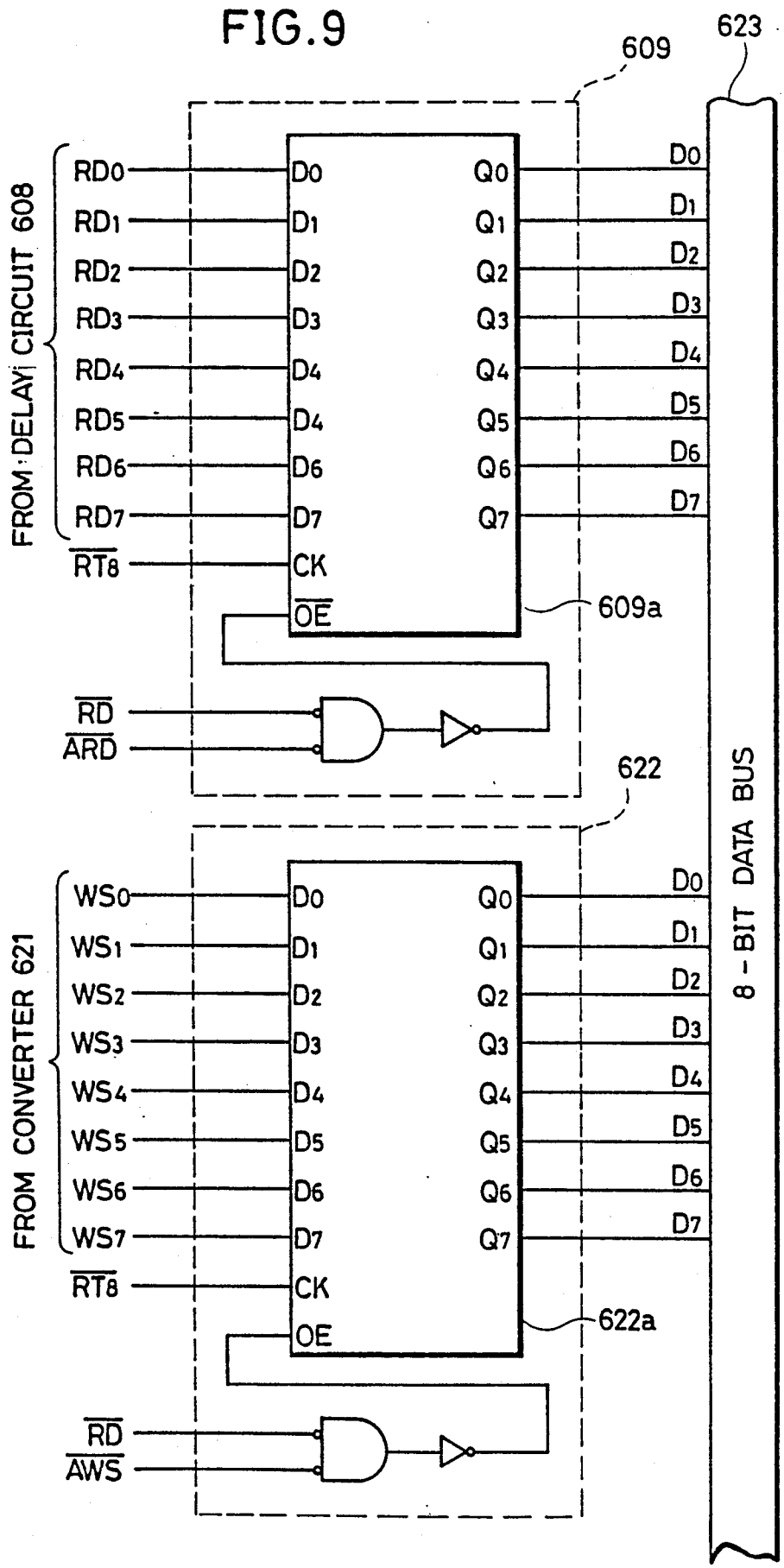
FIG. 9 is a block diagram showing details of the received data output port and the word synchronization detection output port shown in FIG. 4.

FIG. 9 is a block diagram showing details of these output ports 609 and 622. In the diagram, the output port 609 includes a 8-bit three-state buffer register 609a which latches the 8-bit outputs $RD_0$ to $RD_7$ of the delaying circuit 608 at a timing of the clock $\overline{RT8}$ from the frequency-dividing circuit 610, and the latched data are, in response to the read-out signal $\overline{RD}$ and the address signal $\overline{ARD}$, read out on the 8-bit data bus 623 as 8-bit data signals $D_0$ to $D_7$. Also the output port 622 includes a 8-bit outputs $WS_0$ to $WS_7$ from the word synchronization detecting shift register 621 at a timing of the clock $\overline{RT8}$, and the latched data are, in response to the read-out signal $\overline{RD}$ and the address signal $\overline{AWS}$, read out on the 8-bit data bus 623 as 8-bit data signals.

Figure 10:
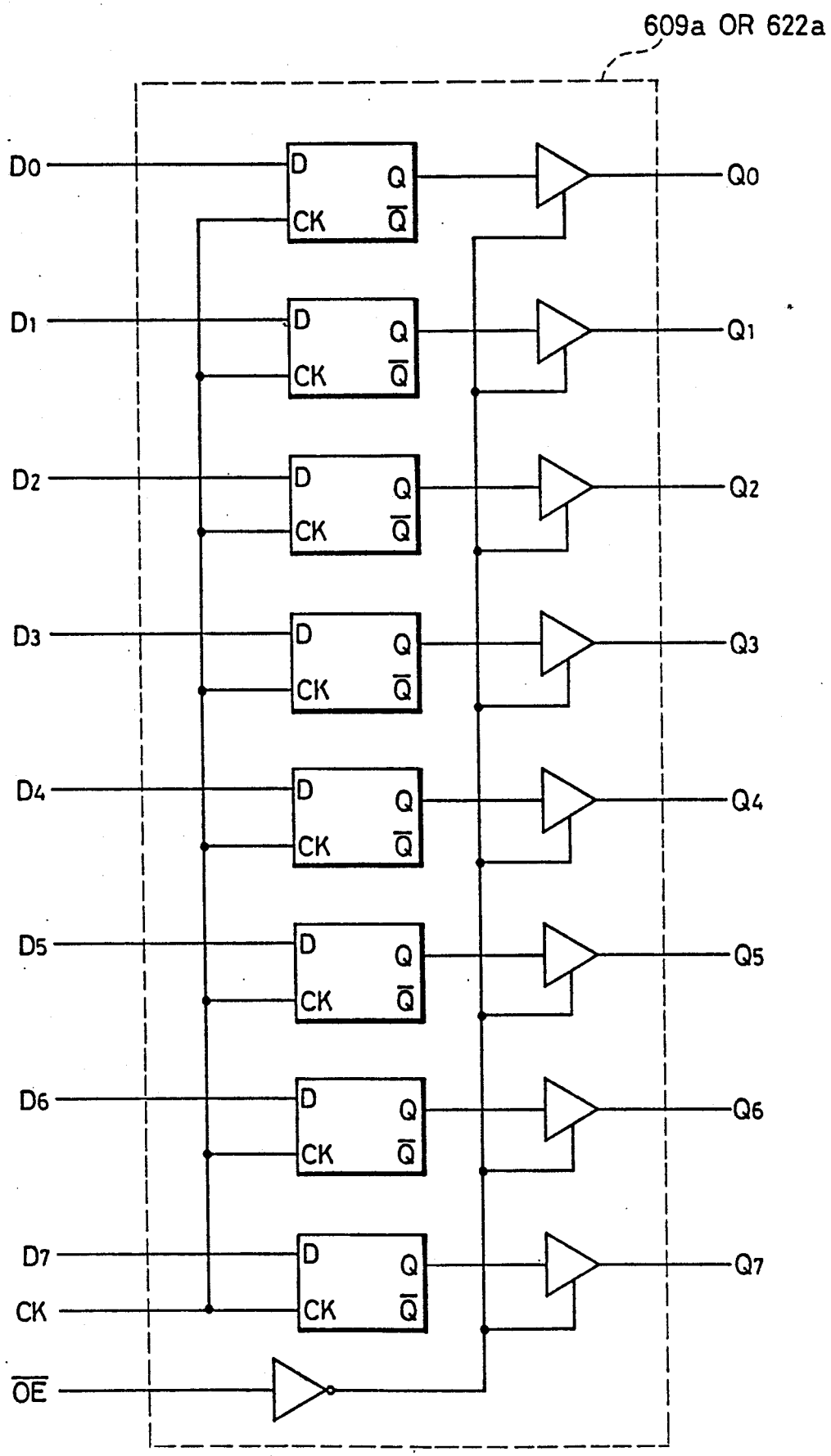
FIG. 10 is a block diagram showing a structure of the three-state buffer register shown in FIG. 9.

FIG. 10 is a diagram showing a structure of the three-state buffer register 609a or 622a in FIG. 9, comprising 8 flip-flops connected in parallel, every Q output of which is provided with a gate. In order to prevent short-circuit through the 8-bit data bus 623, the buffer registers 609a and 622a are constituted such that their gates open so as to allow the data in the buffer registers to be read out on the data bus 623 only when output enabling is sequentially instructed at different timings for each.

FIG. 12(a) shows the NRZ data outputted from the received data output port 609, 8 bits by 8 bits in parallel, and FIG. 12(b) shows the word synchronization data outputted from the word synchronization detection output port 622, 8 bits by 8 bits in parallel. As will be apparent from the description above and FIG. 12, the synchronization data outputted from the output port 622 has a word synchronization identifying flag "1" in a position corresponding to the word synchronization position in the output signal from the output port 609.

Figure 13:
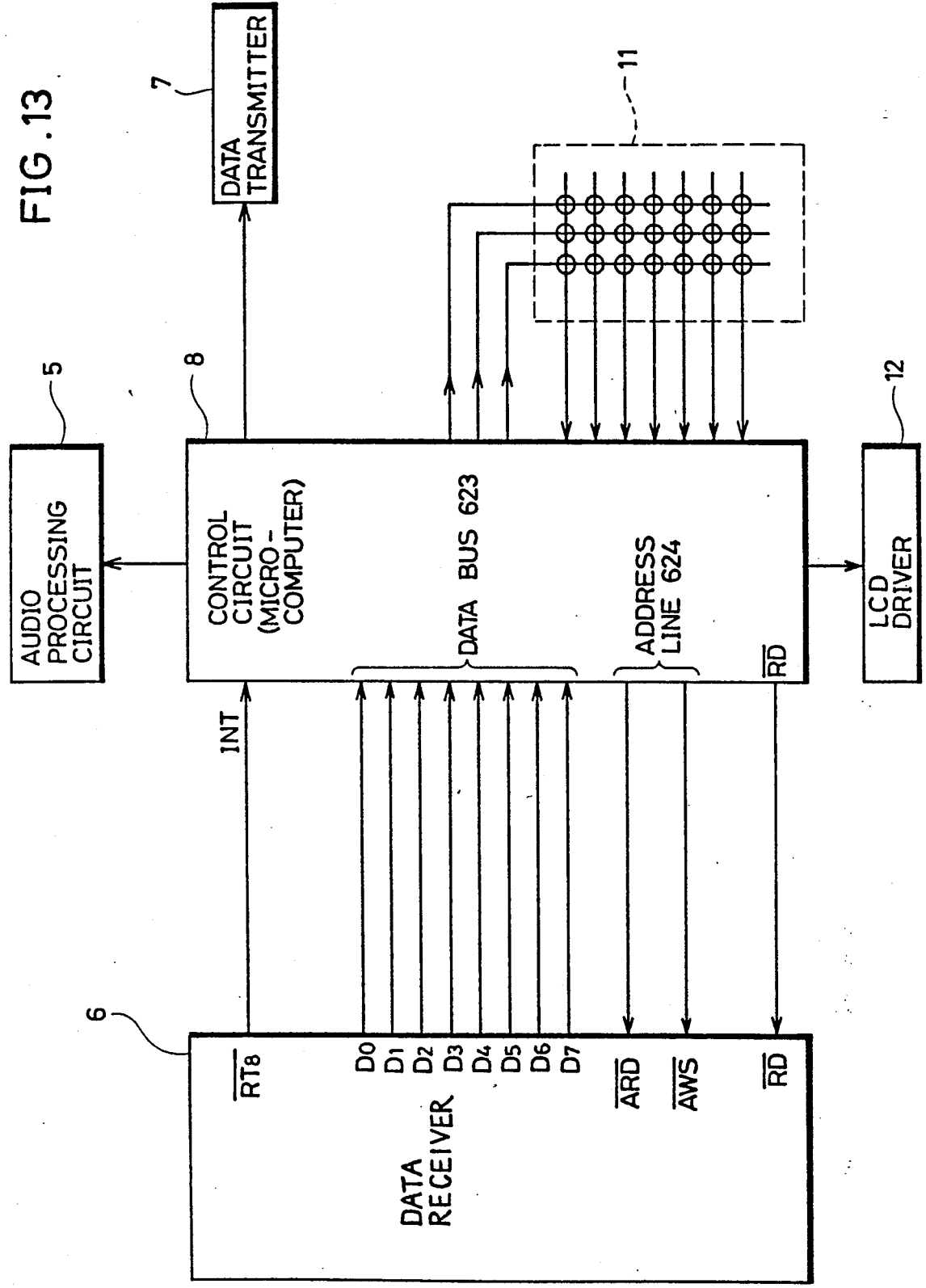
FIG. 13 is a block diagram showing details of the control circuit shown in FIG. 3.

Subsequently, FIG. 13 is a diagram showing connection relationship between the control circuit 8 and its peripheral units in FIG. 3, where the control circuit 8 is implemented as a microcomputer as shown in FIG. 13. The control circuit 8 receives the clock $\overline{RT8}$ from the data receiver 6, as interruption request from the data receiver 6 and the above-mentioned 8-bit received data or the synchronization data $D_0$ to $D_7$ through the data bus 623 as well. The control circuit 8 applies, on the other hand, the above-mentioned address signals $\overline{ARD}$ and $\overline{AWS}$ to the data receiver 6 through a 2-bit address line 624. The control circuit 8 further applies the read-out signal $\overline{RD}$ for the output ports 609 and 622 above. Additionally, the control circuit 8 supplies the audio processing portion 5, the data transmitter 7 and the LCD driver 12 with required signals for controlling their operation, and monitors operation of the key matrix 11.

Figure 14:
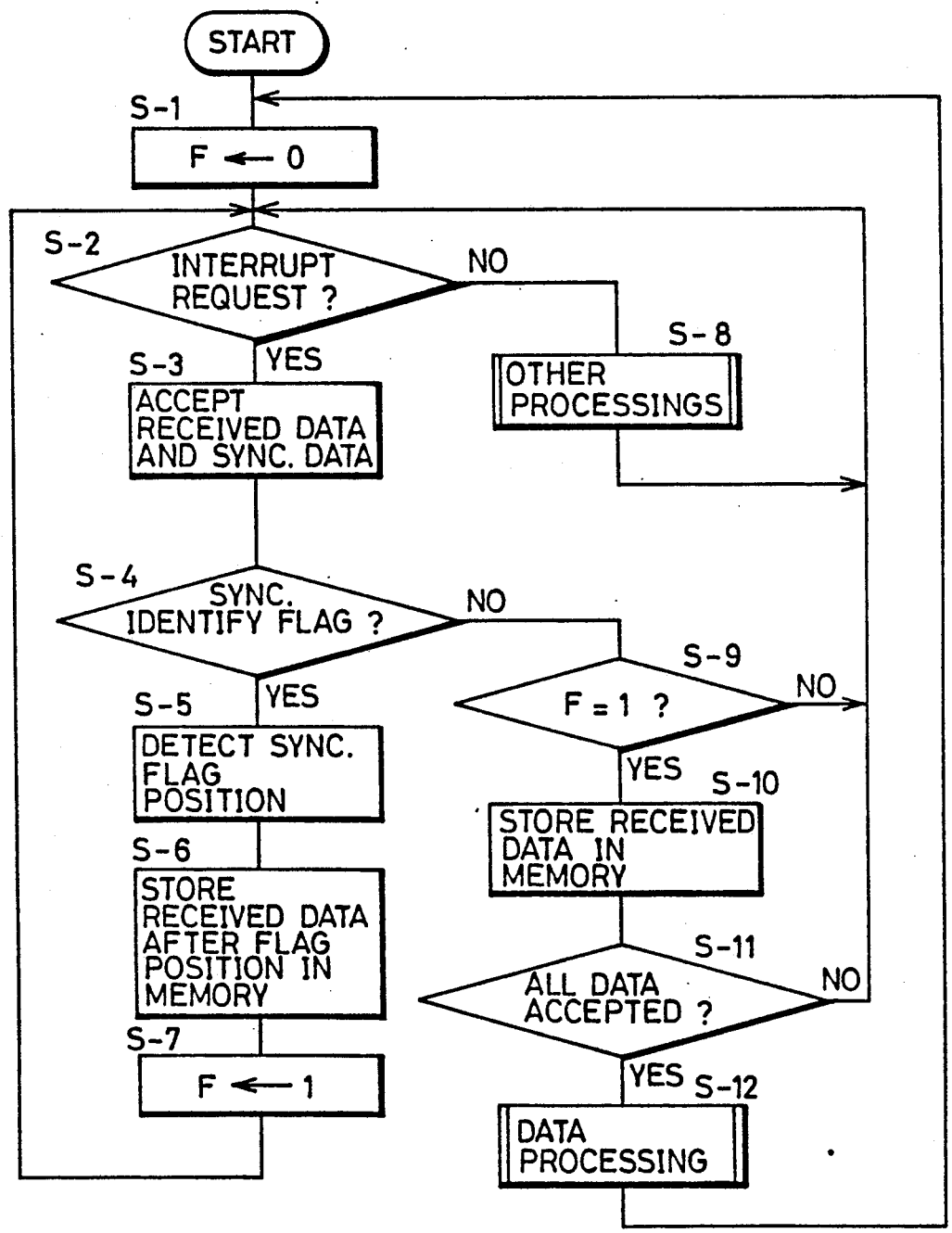
FIG. 14 is a flow chart for explaining operation of the microcomputer shown in FIG. 13.

Furthermore, FIG. 14 is a flowchart for explaining operation of the control circuit 8. In the following, operation of the control circuit 8 will be described with reference to FIGS. 13 and 14.

First, the control circuit 8 resets a flag register F not shown (step S-1) and determines, based on the output signal $\overline{RT8}$ from the frequency-divider 610 in the data receiver 6, whether there exists any interruption request or not (step S-2). When requested, processings such as key scan, LCD drive, audio processing or the like are interrupted so as to accept the 8-bit received data (FIG. 12(a)) and the 8-bit synchronization data (FIG. 12(b)) transmitted from the data receiver 6 through the data bus 623 (step S-3). Subsequently, it is determined whether the word synchronization identifying flag "1" as shown in FIG. 12(b) has been contained in the accepted 8-bit synchronization data (step S-4), and if not, the operation returns to step S-2 through step S-9.

On the other hand, at step S-4, if it is determined that the word synchronization identifying flag has been contained in the synchronization data, then the bit position of the flag is detected (step S-5) and those of the received data that follow the bit position are stored in a memory of the control circuit 8 as effective data (step S-6). In this manner, once word synchronization is established, a flag is set in the above-mentioned flag register F (step S-7).

After that, if any interruption request exists (step S-2), irrespective of presence of the word synchronization identifying flag, the received data are stored in the memory (steps S-6 and S-10). When acceptance of all the received data is accomplished (step S-11), data processings such as busy-idle bit elimination, error correction or the like are executed (step S-12). Meanwhile, the determination of acceptance accomplishment at step S-11 could be made by monitoring the counted value of a word counter which may be provided as being incremented each time data of one word (8 bits) is accepted.

Figure 15:
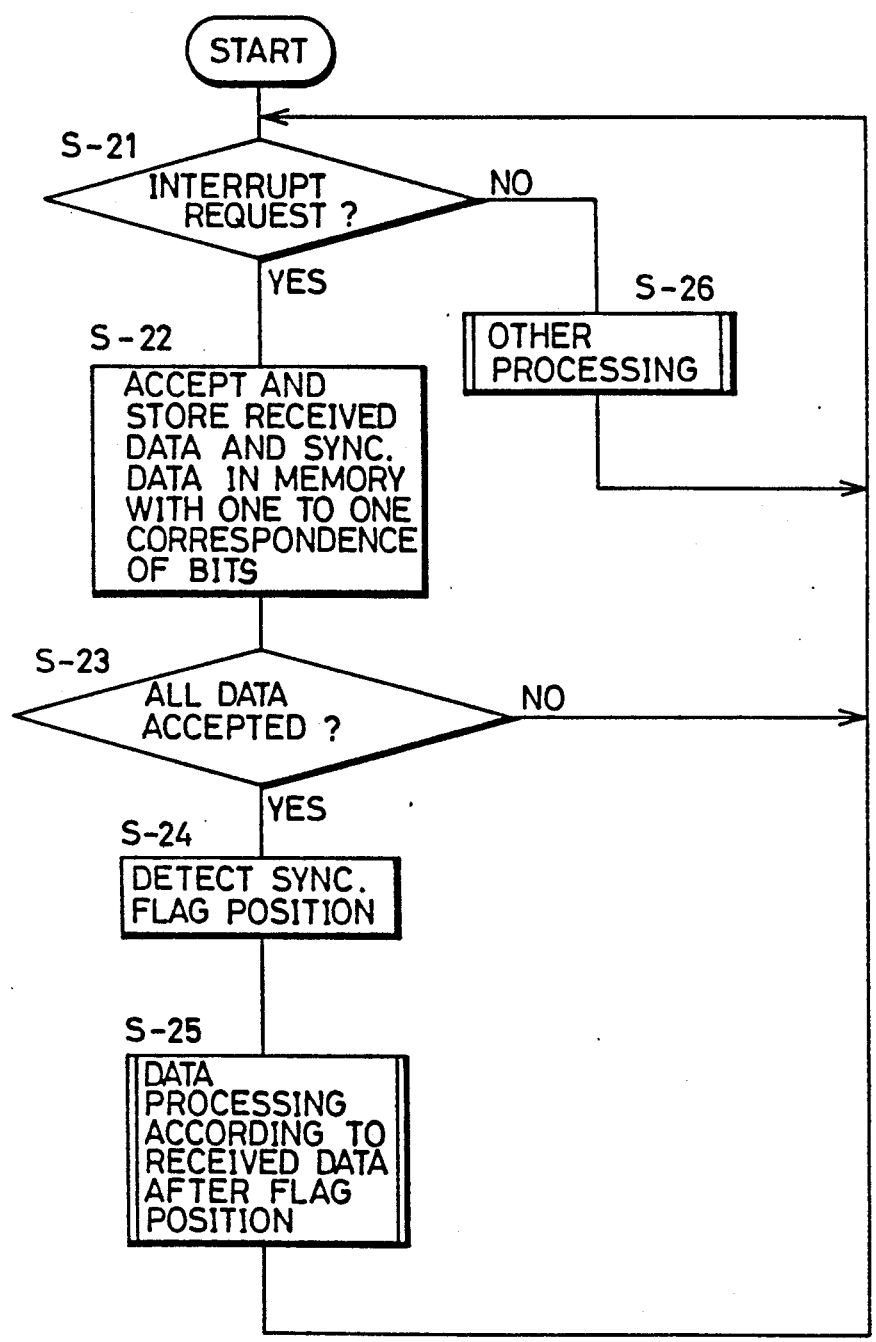
FIG. 15 is a flow chart showing another example of processing by the microcomputer shown in FIG. 13.

Finally, FIG. 15 is a flowchart showing another example of processing by the control circuit 8. In the example shown in FIG. 15, when interruption request is recognized (step S-21), all of the received data and the synchronization data are first accepted and stored in the memory of the control circuit 8 such that data bits of one data correspond to those of the other, one to one (step S-22), as shown in FIG. 12. After all of the received data are accepted (step S-23), the position of the word synchronization identifying flag "1" is detected (step S-24) and then data processings are executed according to those received data among the stored data that follow the detected flag position (step S-25). The above mentioned detection of the word synchronization identifying flag can be done for every 8 bits, so the high speed processing can be achieved.

While in the embodiment above, description has been made on the case where the present invention is applied to word synchronization recovery for a message on the forward control channel in a receiving system, a circuit of the same structure as described above can be also applied to synchronization recovery of a message on the forward audio channel.

As has been described in the foregoing, according to the embodiment of the present invention, since the word synchronization data which indicates a word synchronizing position, and the received data are processed together as parallel data, a fast recovery of the word synchronization becomes possible, allowing a higher-speed processing of every kind required from a radio communication apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A synchronization recovery circuit for recovering word synchronization of serial data containing a predetermined word synchronizing character, comprising:
   data converting means for converting said serial data into first parallel data of n bits, wherein n is an integer with a value of at least 2;
   synchronization data generating means responsive to said serial data for generating second parallel data of n bits which indicates a word synchronizing position in said first parallel data; and control means operably coupled to said data converting means and said synchronization data generating means for recovering word synchronization of said serial data, based on said first and second parallel data.

2. The synchronization recovery circuit according to claim 1, wherein
said data converting means comprises:
first serial-parallel converting means for converting said serial data into said first parallel data at a timing of a predetermined first clock signal ($\overline{RT}$), and wherein
said synchronization data generating means comprises:
second serial-parallel converting means for converting said serial data into third parallel data of m bits at a timing of said first clock signal, the number m being an integer and corresponding to the number of bits of said word synchronizing character;
means for determining that said third parallel data coincides with said predetermined word synchronizing character; and
third serial-parallel converting means for converting output of said determining means into said second parallel data at a timing of a second clock signal (RT) which is a delayed timing relative to said first clock signal.

3. The synchronization recovery circuit according to claim 2, further comprising:
delaying means for latching said first parallel data outputted from said first serial-parallel converting means at a timing of said second clock signal.

4. The synchronization recovery circuit according to claim 3, further comprising:
first latching means for latching said first parallel data outputted from said delaying means at a timing of a third clock signal ($\overline{RT8}$) which has been obtained based on said first clock signal; and
second latching means for latching said second parallel data outputted from said third serial-parallel converting means at a timing of said third clock signal.

5. The synchronization recovery circuit according to claim 4, wherein
said control means comprises means responsive to said third clock signal for executing interruption processing in which first and second parallel data having been latched in said first and second latching means, respectively, are accepted.

6. The synchronization recovery circuit according to claim 5, wherein
said first and second parallel data are accepted into said control means at different timings 7. The synchronization recovery circuit according to claim 5, wherein
said control means executes any other processing than the word synchronization recovery except the time that said interruption processing is to be executed.

8. The synchronization recovery circuit according to claim 5, wherein
said control means comprises:
storage means;
means for determining whether a synchronization identifying bit indicative of a word synchronizing position is contained in said accepted second parallel data; and means for storing those data among said first parallel data that follow the bit corresponding to said synchronization identifying bit, as effective data into said storage means when it has been determined that said synchronization identifying bit is contained.

9. The synchronization recovery circuit according to claim 5, wherein
said control means comprises:
storage means;
means for storing said accepted first and second parallel data into said storage means such that data bits of one data correspond to those of the other, one to one;
means for determining whether the synchronization identifying bit indicative of a word synchronizing position is contained in said second parallel data stored in said storage means; and
means for using those data among said first parallel data that follow the bit corresponding to said synchronization identifying bit, as effective data for data processing when it has been determined that said synchronization identifying bit is contained.

10. The synchronization recovery circuit according to claim 2, wherein
said first serial-parallel converting means comprises an n-bit shift register.

11. The synchronization recovery circuit according to claim 2, wherein
said second serial-parallel converting means comprises an m-bit shift register.

12. The synchronization recovery circuit according to claim 2, wherein
said coincidence determining means comprises logic circuit means having m inputs.

13. The synchronization recovery circuit according to claim 2, wherein
said third serial-parallel converting means comprises an n-bit shift register.

14. The synchronization recovery circuit according to claim 3, wherein
said delaying means comprises an n-bit buffer register.

15. The synchronization recovery circuit according to claim 4, wherein
each of said first and second latching means comprises an n-bit three-state buffer register whose reading operation is controlled by said control means.

16. The synchronization recovery circuit according to claim 1, wherein
said serial data is a forward control channel message in a cellular-type communication system.

17. The synchronization recover circuit according to claim 1, wherein
said serial data is a forward audio channel message in a cellular-type communication system.

18. A radiocommunication apparatus which at least has a function of receiving data outputted from a radio base station, comprising:
means for receiving and demodulating said transmitted data;
means for extracting serial data containing a predetermined word synchronizing character out of said received data; and
synchronization recovering means for recovering word synchronization of said serial data, wherein said synchronization recovering means comprises:

data converting means for converting said serial data into first parallel data of n bits, wherein n is an integer with a value of at least 2;

synchronization data generating means responsive to said serial data for generating second parallel data of n bits which indicates a word synchronizing position in said first parallel data; and control means operably coupled to said data converting means and said synchronization data generating means for recovering word synchronization of said serial data, based on said first and second parallel data, and performing required processings, based on the data whose word synchronization has been recovered.

19. The radiocommunication apparatus according to claim 18, wherein said data converting means comprises:

first serial-parallel converting means for converting said serial data into said first parallel data at a timing of a predetermined first clock signal ($\overline{RT}$), and wherein said synchronization data generating means comprises:

second serial-parallel converting means for converting said serial data into third parallel data of m bits at a timing of said first clock signal, the number m being an integer and corresponding to the number of bits of said word synchronizing character;

means for determining that said third parallel data coincides with said predetermined word synchronizing character; and third serial-parallel converting means for converting output of said determining means into said second parallel data at a timing of a second clock signal (RT) which is a delayed timing relative to said first clock signal.

20. The radiocommunication apparatus according to claim 19, further comprising:

delaying means for latching said first parallel data outputted from said first serial-parallel converting means at a timing of said second clock signal.

21. The radiocommunication apparatus according to claim 20, further comprising:

first latching means for latching said first parallel data outputted from said delaying means at a timing of a third clock signal ($\overline{RT8}$) which has been obtained based on said first clock signal; and second latching means for latching said second parallel data outputted from said third serial-parallel converting means at a timing of said third clock signal.

22. The radiocommunication apparatus according to claim 21, wherein said control means comprises means responsive to said third clock signal for executing interruption processing in which first and second parallel data having been latched in said first and second latching means, respectively, are accepted.

23. The radiocommunication apparatus according to claim 22, wherein said first and second parallel data are accepted into said control means at different timings.

24. The radio communication apparatus according to claim 22, wherein said control means executes any other processing than the word synchronization recovery except the time that said interruption processing is to be executed.

25. The radiocommunication apparatus according to claim 22, wherein said control means comprises:

storage means;

means for determining whether a synchronization identifying bit indicative of a word synchronizing position is contained in said accepted second parallel data; and means for storing those data among said first parallel data that follow the bit corresponding to said synchronization identifying bit, as effective data into said storage means when it has been determined that said synchronization identifying bit is contained.

26. The radiocommunication apparatus according to claim 22, wherein said control means comprises:

storage means;

means for storing said accepted first and second parallel data into said storage means such that data bits of one data correspond to those of the other, one to one;

means for determining whether a synchronization identifying bit indicative of a word synchronizing position is contained in said second parallel data stored in said storage means; and means for using those data among said first parallel data that follow the bit corresponding to said synchronization identifying bit, as effective data for data processing when it has been determined that said synchronization identifying bit is contained.

27. The radiocommunication apparatus according to claim 19, wherein said first serial-parallel converting means comprises an n-bit shift register.

28. The radiocommunication apparatus according to claim 19, wherein said second serial-parallel converting means comprises an m-bit shift register.

29. The radiocommunication apparatus according to claim 19, wherein said coincidence determining means comprises logic circuit means having m inputs.

30. The radiocommunication apparatus according to claim 19, wherein said third serial-parallel converting means comprises an n-bit shift register.

31. The radiocommunication apparatus according to claim 20, wherein said delaying means comprises an n-bit buffer register.

32. The radiocommunication apparatus according to claim 21, wherein each of said first and second latching means comprises an n-bit three-state buffer register whose reading operation is controlled by said control means.

33. The radiocommunication apparatus according to claim 18, wherein said serial data is a forward control channel message in a cellular-type communication system.

34. The radiocommunication apparatus according to claim 18, wherein said serial data is a forward audio channel message in a cellular-type communication system.

35. The radiocommunication apparatus according to claim 18, further comprising:

audio processing means for extracting data comprising an audio signal out of said received data and processing the same.

36. The radiocommunication apparatus according to claim 35, further comprising:
means for receiving data from said control means and said audio processing means, and transmitting the same to said radio base station.

* * * * *